United States Patent [19]

Sata

[11] Patent Number: 4,889,745
[45] Date of Patent: Dec. 26, 1989

[54] METHOD FOR REACTIVE PREPARATION OF A SHAPED BODY OF INORGANIC COMPOUND OF METAL

[75] Inventor: Nobuhiro Sata, Sendai, Japan

[73] Assignee: Japan as represented by Director General of Agency of Industrial Science and Technology, Tokyo, Japan

[21] Appl. No.: 123,953

[22] Filed: Nov. 23, 1987

[30] Foreign Application Priority Data

Nov. 28, 1986 [JP] Japan ................................. 61-284879
Mar. 26, 1987 [JP] Japan ................................. 62-72470

[51] Int. Cl.$^4$ ............................................. C04B 35/65
[52] U.S. Cl. ....................................... 427/12; 264/27; 264/56; 264/314; 427/190; 427/376.1; 427/376.2; 427/376.4; 427/370
[58] Field of Search ..................... 264/56, 84, 27, 314; 427/190, 376.1, 376.2, 376.4, 370, 12

[56] References Cited

U.S. PATENT DOCUMENTS 3,404,202  10/1968  Carlson et al. ..................... 264/84

FOREIGN PATENT DOCUMENTS 60-246270  12/1985  Japan .

Primary Examiner—James Derrington
Attorney, Agent, or Firm—Wyatt, Gerber, Burke & Badie

[57] ABSTRACT

A shaped body of a refractory or other functional inorganic compound of a metal, e.g., borides, carbides, silicides, etc. of titanium, zirconium, niobium and the like in a plate-like form can be prepared by an in situ reactive sintering method in which a metal-made flat reaction capsule is filled with a mixture of the reactant powders to form a powder compact which is ignited at a periphery while the capsule is under hydraulic compression so that the exothermic reaction is efficiently and almost instantaneously propagated within the plane of the plate-like powder compact. The liquid compression medium communicates to an accumulator filled with a compressed gas so that the otherwise unavoidable sudden pressure decrease due to the shrinkage of the powder compact can be compensated by the expansion of the compressed gas to keep constancy of the pressure. When a subsstrate plate is embedded in the powder compact and the exothermic reaction is performed similarly, the powder compact is converted into a coating layer of the resultant compound which is firmly bonded to the substrate surface.

12 Claims, 2 Drawing Sheets

METHOD FOR REACTIVE PREPARATION OF A SHAPED BODY OF INORGANIC COMPOUND OF METAL

BACKGROUND OF THE INVENTION

The present invention relates to a method for reactive preparation of a shaped body of a refractory or other functional inorganic compound of a metal. More particularly, the invention relates to a method for the preparation of a shaped body of an inorganic compound of a metal in a thinly extended or plate-like form by the in situ reaction in a powder compact of reactant components under compression. The invention also relates to a method for forming a coating layer of a refractory or other functional inorganic material on the surface of a substrate by the in situ reaction in the coating layer of a power mixture of reactant components on the substrate surface.

In the prior art, shaped bodies of a refractory or other functional inorganic compound of a metal, such as carbides, borides, silicides, sulfides, nitrides and oxides of a metal, e.g., aluminum, titanium, zirconium, magnesium, molybdenum, etc., are prepared usually in the so-called power metallurgical method in which the respective compound is manufactured in a fine powdery form which is shaped, for example, by compression molding into a powder compact or green body followed by prolonged heating to effect sintering of the green body at a high temperature under normal pressure or under high pressure using a hot press or hot isostatic press. This conventional method is disadvantageous due to the lengthy sintering process taking a long time and the low versatility of the method when a sintered body of a complicated form is desired.

As a method for forming a coating layer of an inorganic compound on the surface of a substrate such as ceramics, there are known several methods including the plasma spray method, CVD method, PVD method and the like. These methods are advantageously utilized when the desired coating layer has a relatively small thickness but the method is hardly practical when a coating layer having a relatively large thickness is desired because the rate of deposition of the coating layer is usually low.

Recently, a method of reactive sintering is disclosed in Japanese Patent Kokai No. 60-246270 and Japanese Patent Kohyo No. 57-500289 according to which a shaped body of a ceramic such as titanium boride is prepared by igniting a powder mixture of a metallic element, e.g., titanium, and a non-metallic element, e.g., boron, so that the exothermic reaction between the elements is propagated to the whole mass of the powder mixture and the powder mixture is converted in situ into a sintered body of the compound of the metallic and non-metallic elements by the heat of reaction without supply of external heat. This method, however, is not quite satisfactory in respect of the relatively low conversion of the starting powdery reactants into the desired compound so that the thus obtained sintered body cannot have fully reproducible properties.

SUMMARY OF THE INVENTION

The present invention accordingly has an object to provide a novel and improved method for the preparation of a shaped body of a refractory or other functional inorganic compound such as titanium boride, titanium carbide, titanium nitride and the like, having, in particular, a plate-like configuration by the method of in situ reaction.

The present invention further has another object to provide a novel and improved method for forming a coating layer of a refractory or other functional inorganic compound on the surface of a substrate by the method of in situ reaction without the problems and disadvantages in the conventional methods.

Thus, the method of the present invention for the preparation of a shaped body of a refractory or other functional inorganic compound of a metal comprises the steps of:

(A) filling a capsule made of a metal having a flat configuration with a powder mixture composed of a powder of a metal and a powder of an element or a compound of an element capable of exothermically reacting with the powder of the metal to form a carbide, boride, silicide, sulfide, nitride or oxide of the metal to form a powder compact in the form of a plate;

(B) hermetically sealing the capsule;

(C) hydraulically compressing the capsule in a liquid compression medium communicating to an accumulator of a compressed gas; and (D) igniting the powder compact at a periphery thereof to initiate the exothermic reaction of the powder mixture so that the reaction is propagated in the direction within the plane of the plate of the powder compact.

Further, the method of the invention for coating a substrate plate with a refractory or other functional inorganic compound of a metal comprises the steps of:

(a) putting a substrate plate into a capsule made of a metal having a flat configuration;

(b) filling the space within the capsule with a powder mixture composed of a powder of a metal and a powder of an element or a compound of an element capable of exothermically reacting with the powder of the metal to form a carbide, boride, silicide, sulfide, nitride or oxide of the metal to form a layer of a powder compact of the powder mixture on the surface of the substrate plate;

(c) hermetically sealing the capsule;

(d) hydraulically compressing the capsule in a liquid compression medium communicating to an accumulator of a compressed gas; and (e) igniting the layer of the powder compact at a periphery thereof to initiate the exothermic reaction of the powder mixture so that the reaction is propagated in the direction within the plane of the layer of the powder compact.

DETAILED DESCRIPTION OF THE PREFERRED EMBODIMENTS

Figure 1:
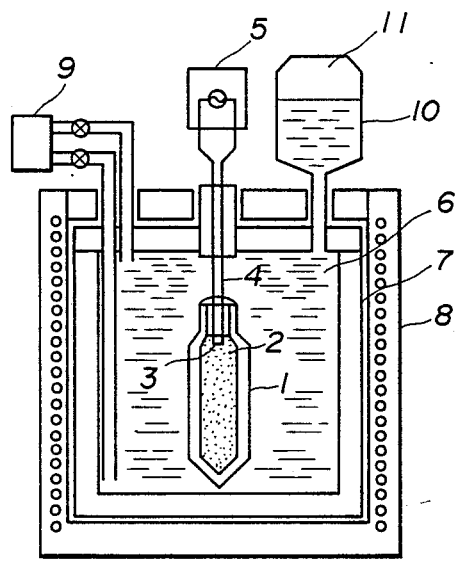
FIGS. 1 and 2 are each a schematic illustration of a vertical cross section of an apparatus under reactive preparation of a shaped body of an inorganic compound according to the inventive method.

As is described above, the inventive method is directed, on one hand, to the reactive preparation of an inorganic compound of a metal shaped in a thinly extended form or a plate-like form and, on the other hand, to a process for reactively forming a coating layer of an inorganic compound of a metal on the surface of a substrate.

The metal above implied is not particularly limitative provided that the metallic element as a first reactant is exothermically reactive with a second reactant to form an inorganic compound of the metallic element such as carbides, borides, silicides, sulfides, nitrides and oxides. Exemplary of suitable metals are titanium, zirconium, niobium, molybdenum, tantalum, tungsten, vanadium, aluminum, hafnium, and rare earth metals. The second reactant to be reacted with the metallic element as the first reactant should be selected according to the desired kind of the inorganic compound. For example, carbides, borides, silicides and sulfides of metallic elements can be produced by using carbon, boron, silicon and sulfur, respectively, in an elementary form although various compounds of these non-metallic elements can be sued provided that the compound can exothermically react with the metallic element to produce the carbide, boride, silicide or sulfide of the metallic element. Nitrides and oxides, on the other hand, cannot be obtained by reacting with nitrogen or oxygen since nitrogen and oxygen are each a gas at the reaction temperature. Instead, a nitride of a metal can be obtained by suing a suitable solid nitriding agent such as sodium azide $NaN_3$ and oxide of a metal can be obtained by using a suitable oxidizing agent such as sodium oxide. It should be noted that the inventive method is applicable not only to the reactive preparation from a combination of a metallic element and a non-metallic element but also to the preparation of an intermetallic compound such as NiAl provided that the reaction of forming the intermetallic compound from the component metals proceeds exothermically. It is optional that each of the reactants described above is a combination of two kinds or more so that the resultant shaped body is not of a single compound but is a composite body.

The above described reactants each should be in a finely pulverized powdery form although the optimum particle diameter depends on the types of the reactants and reaction conditions. Generally speaking, the powder should have a particle size distribution not exceeding 0.1 mm in diameter.

The mixing ratio of the reactants each in a powdery form is not limited to a stoichiometric ratio but one of the reactants can be used in excess of the stoichiometry so that the resultant shaped body is formed of a composite composed of the reaction product of the reactants and the unreacted reactant. For example, a metal and boron are mixed together in a molar ratio in favor of the metal over stoichiometry and reacted according to the inventive method so that the resultant shaped body is formed of a composite of the metal boride and the unreacted metal.

In step (A) of the inventive method, a metal-made reaction capsule is filled with a powder mixture obtained by intimately mixing the reactant powders to form a powder compact therein. The capsule should be made of a metal having a high thermal conductivity in order that the heat of reaction taking place in the capsule is rapidly dissipated to avoid accumulation of the heat of reaction resulting in melting of the capsule walls. In this regard, copper and certain alloys of copper are preferred as the material of the reaction capsule. The thickness of the capsule wall is an important factor and a copper-made reaction capsule usually should have a wall thickness of 1 to 3 mm though not particularly limited thereto. When the wall thickness of the capsule wall is too large so that the capsule wall has high rigidity, the hydraulic pressure of the compression medium cannot be fully transmitted to the powder compact in the capsule. When the wall thickness of the reaction capsule is too small, on the other hand, the capsule is under a danger of possible melt-down by the heat of reaction taking place inside the capsule. The metal-made reaction capsule used in the inventive method should have a flat configuration without or with curvature so that the powder compact filling the capsule also necessarily takes a flatly extended or plate-like configuration. This condition is important because, once the powder compact in the capsule is ignited at a periphery, the exothermic reaction can proceed very evenly and rapidly in the direction perpendicular to the direction of the compressive force of the compression medium which the capsule walls receive. In this regard, the thickness of the flat space inside the reaction capsule should not exceed several millimeters.

Now, the method of the invention is described with reference to the accompanying drawing. In FIG. 1 schematically illustrating a cross section of an apparatus for practicing the inventive method, a metal-made capsule 1 is filled with a powder mixture of the reactants to form a powder compact 2 and hermetically sealed. The space inside the capsule 1 should preferably be vacuumized in order to minimize occlusion of a gas in the product of the desired shaped body although it is optional with an object to simplify the process over vacuumization to fill the space with a gas such as nitrogen and oxygen when the desired reactively sintered body is a nitride and oxide, respectively, of a metallic element. The reaction capsule should be provided with a means for ignition of the powder compact at one end. A convenient igniting means is a platinum filament 3 supported by two copper-made stems 4 and connected to an outer power source 5. The stems 4 should of course be electrically insulated from the walls of the capsule 1.

The metal-made reaction capsule 1 equipped with an igniting means 3 and thus filled with the powder compact 2 is then put into a liquid compression medium 6 contained in a pressurizable vessel 7, which in turn is placed in an over 8 as a heating means to increase the temperature of the liquid compression medium 6, for example, up to 300τ or higher. Although it is not necessary in most cases to increase the temperature of the compression medium 6, it is more advantageous that the liquid compression medium 6 is heated in advance when the quantity of the heat of reaction produced by the exothermic reaction is not large enough. Various kinds of liquids can be used as the liquid compression medium including water, hydraulic oils, molten salts and low-melting alloys although water is used conveniently in most cases.

The liquid compression medium 6 contained in the pressurizable vessel 7 can be pressurized by means of a liquid compressor 9 so that the reaction capsule 1 is compressed hydraulically. The pressure of the liquid compression medium 6 should be as high as possible but at least 10 MPa in order to ensure complete densification of the desired shaped body of the powder compact 2. A pressure of 25 MPa or higher is usually sufficient. It is essential in the inventive method that the liquid compression medium 6 communicates to an accumulator 10 filled with a compressed gas, e.g., air, 11. The role played by the gas accumulator 10 is as follows. When the powder compact 2 in the metal-made reaction capsule 1 is ignited at a periphery by means of the igniter 3, the exothermic reaction in the powder compact proceeds almost explosively and is completed usually within a few seconds to form the desired compound of the metallic element. This reaction naturally causes a considerably shrinkage of the powder compact 2 so that, assuming that the liquid compression medium 6 does not communicate to a gas accumulator, the pressure of the liquid compression medium unavoidably is suddenly decreased, however the liquid compressor 9 is powerful, because of the non-expandability of the liquid. When the liquid compression medium 6 communicates to a gas accumulator 10 filled with a compressed gas 11, the volume shrinkage of the reaction capsule 1 or consequent pressure reduction of the liquid compression medium 6 is immediately compensated by the expansion of the compressed gas 11 under a pressure balance with the liquid compression medium 6 so that the fluctuation in the pressure of the liquid compression medium 6 can be minimized during the proceeding of the exothermic reaction of the powder compact 2.

Figure 2:
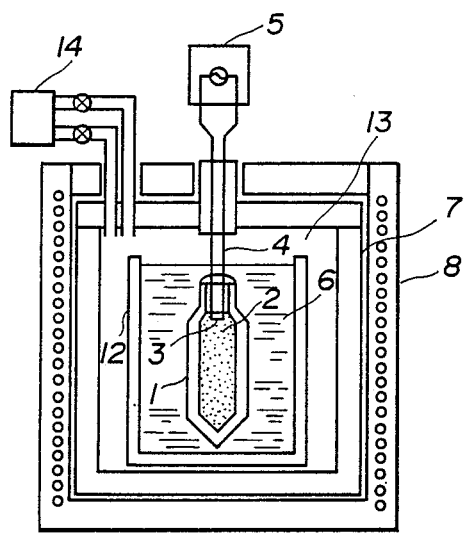

FIG. 2 illustrates another apparatus used for practicing the inventive method, which is alternative of the apparatus illustrated in FIG. 1. Instead of the use of a gas accumulator, the liquid compression medium 6 is contained in a nonpressurizable vessel 12 which is placed inside a pressurizable vessel 7 leaving a gaseous space 13 therein. Instead of being pressured directly with a liquid compressor, the liquid compression medium 6 in FIG. 2 is indirectly pressurized by means of the gaseous atmosphere 13 which is under compression with a gas compressor 14. When sudden volume shrinkage of the reaction capsule 1 occurs to cause lowering of the surface level of the level compression medium 6, the gas in the space 13 immediately expands to minimize the pressure decrease inside the pressurizable vessel 7. In other words, the gaseous space 13 filled with a compressed gas is an equivalent means of the gas accumulator 10 filled with a compressed gas 11 in FIG. 1.

Figure 3:
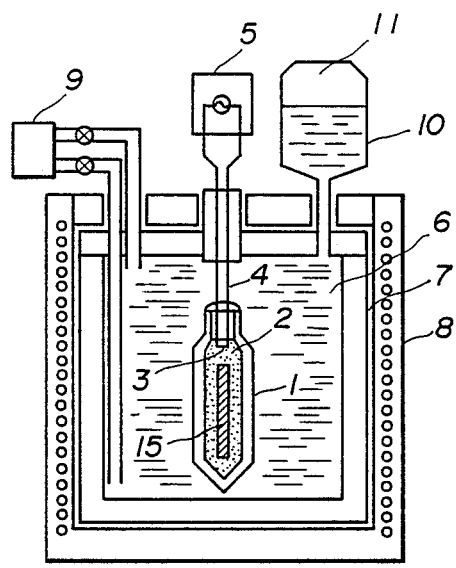
FIGS. 3 and 4 are each a schematic illustration of the same apparatus as in FIGS. 1 and 2, respectively, in the process of reactively forming a coating layer of an inorganic compound on the surface of a substrate according to the invention method.
Figure 4:
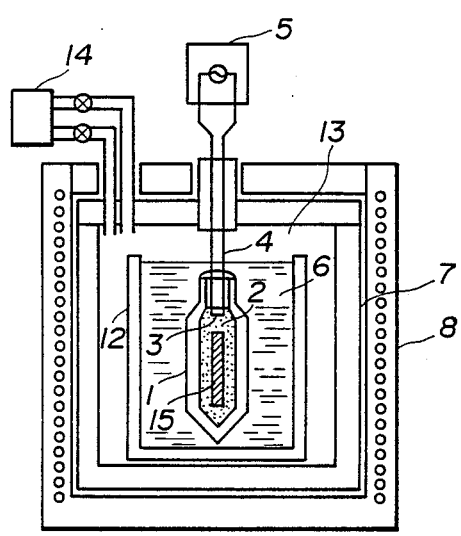

FIGS. 3 and 4 each illustrate the same apparatus as illustrated in FIGS. 1 and 2, respectively, to show the inventive method for forming a coating layer on the surface of a substrate plate. Instead of filling the metal-made capsule 1 with the powder mixture alone to form a powder compact 2, a substrate plate 15 is inserted into the capsule 1 and the space between the capsule walls and the substrate plate 15 is filled with the powder mixture of the reactants so that the substrate plate 15 is embedded in the power compact 2 forming a coating layer on the substrate surface. When the coating layer of the powder compact 2 is ignited at a periphery in the same manner as described above, the exothermic reaction is propagated within the coating layer toward the other end so that the powder compact 2 is converted into a coating layer of the compound as the product of the reaction. The thickness of the coating layer can be controlled by adequately selecting the dimensions of the reaction capsule and the thickness of the substrate plate. The thus formed coating layer is firmly bonded to the surface of the substrate plate 15 though dependent on the affinity between the coating layer and the substrate surface. Although the material of the substrate plate is not particularly limitative, it should have a heat resistance to withstand the temperature at which the exothermic reaction proceeds and should have a sufficiently high affinity with the coating layer formed thereon. A very firmly bonded coating layer can be obtained usually when the substrate plate made of a metal is coated with a coating layer of a compound of the same metal usually as in the combinations of titanium and the boride or carbide of titanium, zirconium and zirconium boride, niobium and niobium boride and the like although other combinations such as a substrate plate of copper and a coating layer of titanium boride can give quite satisfactory results.

In the following, the method of the present invention is described in more detail by way of examples.

EXAMPLE 1

A copper-made reaction capsule of 40 mm by 50 mm by 10 mm outer dimensions having a wall thickness of 2 mm was filled with a powder mixture prepared by thoroughly mixing a powder of metallic titanium having an average particle diameter of about 10 $\mu$m and a powder of boron having an average particle diameter of 0.5 $\mu$m in a molar ratio of 11:9 to form a layer of the powder compact having a thickness of 6 mm and the capsule was sealed under vacuum. The capsule was provided at one end with an igniter which was made of a platinum wire of 0.5 mm diameter welded to the ends of two stems of cooper wire. The platinum wire of the ignited was in contact with a periphery of the layer of the powder compact in the capsule. The reaction capsule was put in water as the pressurizing medium filling a pressurizable vessel as illustrated in FIG. 1. The aqueous pressurizing medium communicated with an accumulator filled with compressed air. When the pressure of the pressurizing medium was increased and had reached 25 MPa by operating the compressor at room temperature, the platinum wire of the ignited was heated by instantaneously passing electric current so that the powder compact in the reaction capsule was ignited at a periphery to start the reaction between the titanium powder and boron powder. The reaction was complete within a few seconds. After completion of the reaction, the pressure inside the pressurizable vessel was released and the reaction capsule was taken out and opened. The powder compact in the capsule was found to have been converted into a plate-like shaped body having a dense structure of which the porosity was 3%. Analysis of the shaped body indicated that it was a composite body composed of titanium boride TiB and unreacted metallic titanium.

EXAMPLE 2

A plate-like shaped body of titanium diboride $TiB_2$ having a thickness of 2 mm was prepared in substantially the same manner as in Example 1 except that the powder mixture filling the copper-made reaction capsule was a 1:2 by moles mixture of the same titanium powder and the same boron powder.

EXAMPLE 3

A plate-like shaped body of titanium carbide TiC having a thickness of 3 mm was prepared in substantially the same manner as in Example 1 except that a copper-made reaction capsule having a wall thickness of 1 mm was filled with an equimolar mixture of a titanium powder having an average particle diameter of about 10 $\mu$m and a carbon powder having an average particle diameter of about 5 $\mu$m and the powder compact in the reaction capsule was ignited at 300 $\tau$ by heating the aqueous pressurizing medium at this temperature.

EXAMPLE 4

A plate-like shaped body of zirconium diboride ZrB$_2$ having a thickness of 2 mm was prepared in substantially the same manner as in Example 1 except that the copper-made reaction capsule was filled with a 1:2 by moles mixture of a zirconium powder having an average particle diameter of about 3 μm and a boron powder having an average particle diameter of about 0.5 μm.

EXAMPLE 5

A plate-like shaped body of titanium nitride TiN having a thickness of 2 mm was prepared in substantially the same manner as in Example 1 except that the copper-made reaction capsule was filled with a 3:1 by moles mixture of a titanium powder having an average particle diameter of about 10 μm and a powder of sodium azide NaN$_3$ having an average particle diameter of about 100 μm and the capsule was sealed in an atmosphere of nitrogen gas.

EXAMPLE 6

A plate-like shaped body of a composite of titanium diboride TiB$_2$ and titanium carbide TiC having a thickness of 2 mm was prepared in substantially the same manner as in Example 1 except that the copper-made reaction capsule was filled with a 3:4:1 by moles mixture of powders of titanium, boron and carbon each having an average particle diameter of about 10 μm, 0.5 μm and 5 μm, respectively.

EXAMPLE 7

A plate-like shaped body of a composite of titanium diboride TiB$_2$ and metallic copper having a thickness of 2 mm was prepared in substantially the same manner as in Example 1 except that the copper-made reaction capsule was filled with a powder mixture composed of a 1:2 by moles mixture of titanium and boron powders and 40% by weight of a copper powder having an average particle diameter of about 30 μm.

EXAMPLE 8

A plate-like shaped body of an intermetallic compound of nickel and aluminum NiAl having a thickness of 3 mm was prepared in substantially the same manner as in Example 1 except that the copper-made reaction capsule was filled with an equimolar mixture of powders of nickel and aluminum each having an average particle diameter of about 7 μm and about 100 μm, respectively, and the powder compact in the reaction capsule was ignited at 300 τ by heating the pressurizing medium at this temperature.

EXAMPLE 9

A titanium plate having thickness of 1 mm was inserted into a copper-made flat reaction capsule having a wall thickness of 1 mm and the space between the titanium plate and the capsule walls was filled with a 1:2 by moles mixture of powders of titanium and boron so that the titanium plate was sandwiched between layers of the titanium-boron powder compact and the reaction capsule was seated in vacuum. The reaction capsule was put in water as the pressurizing medium contained in a pressurizable apparatus as illustrated in FIG. 3. The pressurizing medium communicated with an accumulator filled with compressed air. When the pressure of the pressurizing medium at room temperature had reached 25 MPa by operating the compressor, the platinum filament in contact with the layer of the powder compact was heated by passing an electric current so that the powder compact was ignited to start the reaction between the titanium and boron powders. After completion of the reaction, the pressure inside the pressurizable vessel was released and the capsule was taken out and opened to obtain a three-layered plate-like shaped body composed of the titanium plate and layers of titanium diboride TiB$_2$ having a dense structure and firmly bonded to the surfaces of the titanium plate as a core.

EXAMPLE 10

The experimental procedure was substantially the same as in Example 9 excepting replacement of the titanium plate with a copper plate having a thickness of 1 mm. The thus obtained plate-like shaped body had a three-layered structure with the copper plate at the core sandwiched with coating layers of titanium diboride TiB$_2$ firmly bonded to the surfaces of the copper plate.

EXAMPLE 11

The experimental procedure was substantially the same as in Example 9 excepting replacement of the powder mixture of titanium and boron with an equimolar mixture of powders of titanium and carbon and the ignition of the powder compact in the reaction capsule was performed at 300 τ by heating the pressurizing medium at this temperature. The thus obtained plate-like shaped body had a three-layered structure with the titanium plate as the core sandwiched with coating layers of titanium carbide TiC firmly bonded to the surfaces of the titanium plate.

EXAMPLE 12

The experimental procedure was substantially the same as in Example 9 except that the titanium plate was replaced with a zirconium plate having a thickness of 1 mm and the powder mixture of titanium and boron was replaced with a 1:2 by moles mixture of powders of zirconium and boron each having an average particle diameter of about 3 μm and 0.5 μm, respectively. The thus obtained plate-like shaped body had a three-layered structure with the zirconium plate as the core sandwiched with coating layers of zirconium diboride ZrB$_2$ firmly bonded to the surfaces of the zirconium plate.

EXAMPLE 13

The experimental procedure was substantially the same as in Example 9 except that the titanium plate was replaced with a niobium plate having a thickness of 1 mm and the powder mixture of titanium and boron was replaced with a 1:2 by moles mixture of powders of niobium and boron each having an average particle diameter of about 10 μm and 0.5 μm, respectively. The thus obtained plate-like shaped body had a three-layered structure with the niobium plate as the core sandwiched with coating layers of niobium diboride NbB$_2$ firmly bonded to the surfaces of the niobium plate.

What is claimed is:

1. A method for the preparation of a shaped body of a refractory or other functional compound of a metal selected from the group consisting of carbides, borides, silicides, sulfides, nitrides and oxides of the metal in the form of a plate which comprises the steps of:
   (A) filling a capsule made of a metal having a flat configuration with a powder mixture composed of a powder of a metal and a powder of an element or a compound of an element capable of exothermically reacting with the powder of the metal to form a carbide, boride, silicide, sulfide, nitride or oxide of the metal to form a powder compact in the form of a plate (B) hermetically sealing the capsule;

(C) hydraulically compressing the capsule in a liquid compression medium communicating to an accumulator of a compressed gas; and (D) igniting the powder compact at a periphery thereof to initiate the exothermic reaction of the powder mixture so that the reaction is propagated in the direction within the plane of the plate of the powder compact said capsule being formed with walls sufficiently thin so that the hydraulic pressure resulting from Step (C) can be fully transmitted to the ignited powder during the exothermic reaction, but of sufficient thickness to withstand the heat of reaction without melt down.

2. A method for coating a substrate plate with a coating layer of a refractory or other functional compound of a metal selected from the group consisting of carbides, borides, silicides, sulfides, nitrides and oxides of the metal which comprises the steps of:

(a) putting a substrate plate into a capsule made of a metal having a flat configuration;

(b) filling the space within the capsule with a powder mixture composed of a powder of a metal and a powder of an element or a compound of an element capable of exothermically reacting with the powder of the metal to form a carbide, boride, silicide, sulfide, nitride or oxide of the metal to form a layer of a powder compact of the powder mixture on the surface of the substrate plate;

(c) hermetically sealing the capsule;

(d) hydraulically compressing the capsule in a liquid compression medium communicating to an accumulator of a compressed gas; and (e) igniting the layer of the powder compact at a periphery thereof to initiate the exothermic reaction of the powder mixture so that the reaction is propagated in the direction within the plane of the layer of the powder compact said capsule being formed with walls sufficiently thin so that the hydraulic pressure resulting from Step (C) can be fully transmitted to the ignited powder during the exothermic reaction, but of sufficient thickness to withstand the heat of reaction without melt down.

3. The method as claimed in claim 1 wherein the metal of which the capsule is made is copper or an alloy of copper.

4. The method as claimed in claim 1 wherein the wall of the capsule has a thickness in the range from 1 to 3 mm.

5. The method as claimed in claim 1 wherein the liquid as the compression medium is water.

6. The method as claimed in claim 1 wherein the pressure of the liquid compression medium in step (C) is at least 10 MPa.

7. The method as claimed in claim 1 wherein the powder compact is ignited in step (D) by passing an electric current through a platinum filament in contact with the periphery of the powder compact.

8. The method as claimed in claim 2 wherein the metal of which the capsule is made is copper or an alloy of copper.

9. The method as claimed in claim 2 wherein the wall of the capsule has a thickness in the range of from 1 to 3 mm.

10. The method as claimed in claim 2 wherein the liquid as the compression medium is water.

11. The method as claimed in claim 2 wherein the pressure of the liquid compression medium in step (d) is at least 10 MPa.

12. The method as claimed in claim 2 wherein the layer of the powder compact is ignited in step (e) by passing an electric current through a platinum filament in contact with the periphery of the layer of the powder compact.

* * * * *